No. 714,242. Patented Nov. 25, 1902.
F. A. RYTHER.
KNOTTING DEVICE FOR AUTOMATIC BINDERS.
(Application filed Feb. 10, 1902.)
(No Model.)  2 Sheets—Sheet 1.
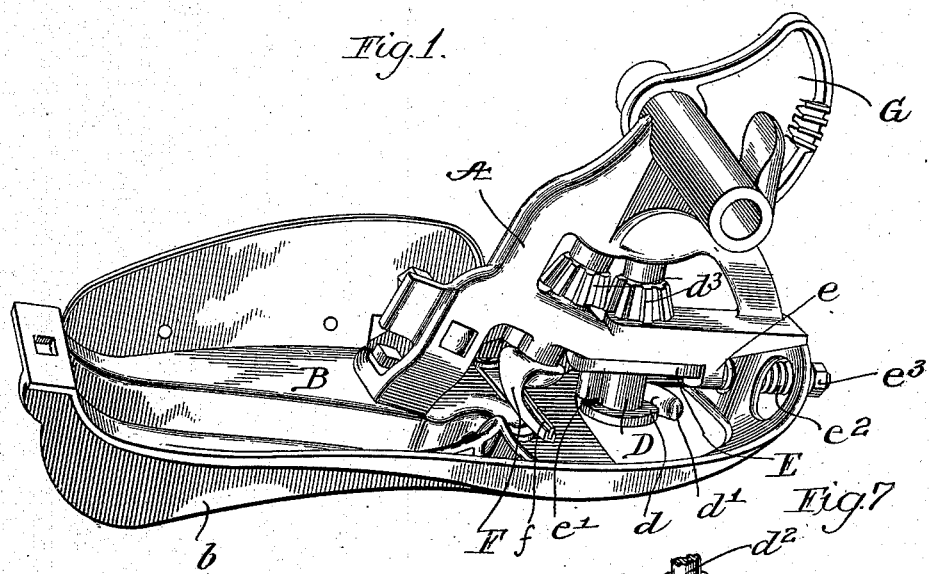
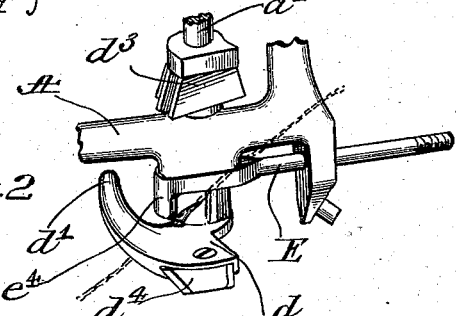
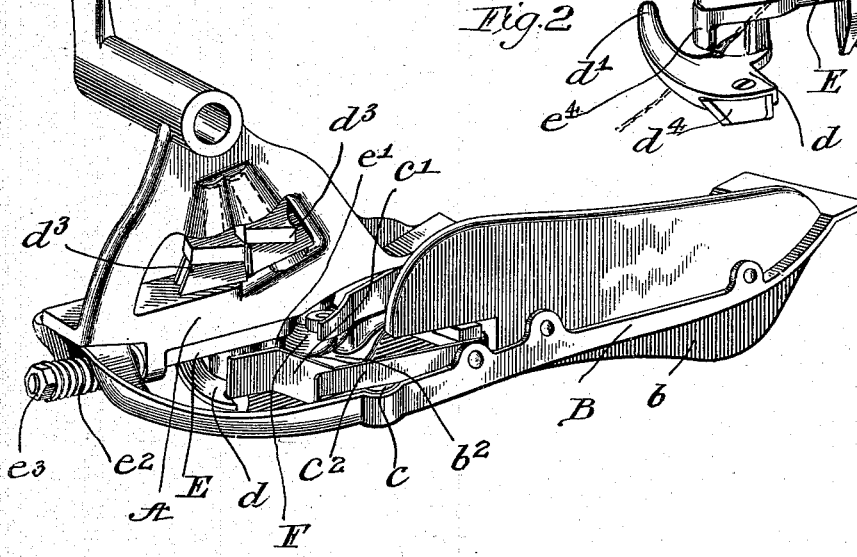
Witnesses:
Edw. Bandt
C. W. Smith
Inventor
Frank. A. Ryther

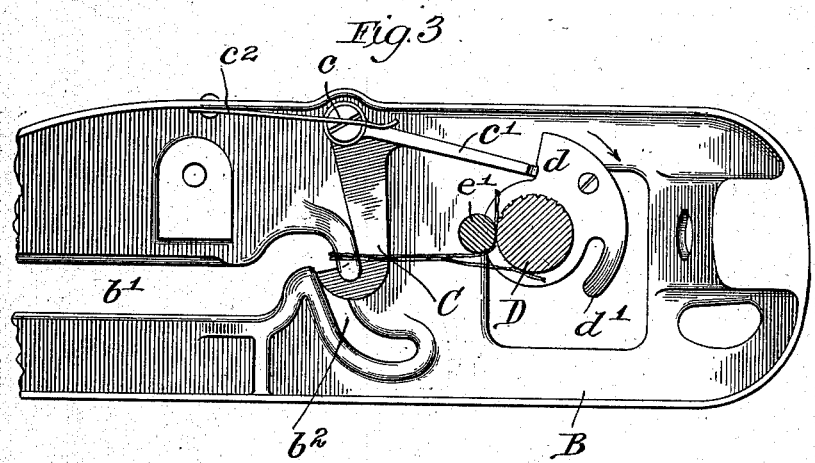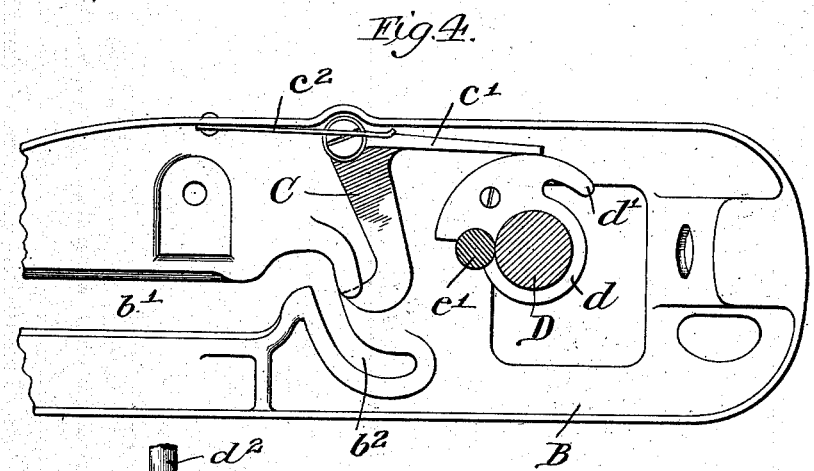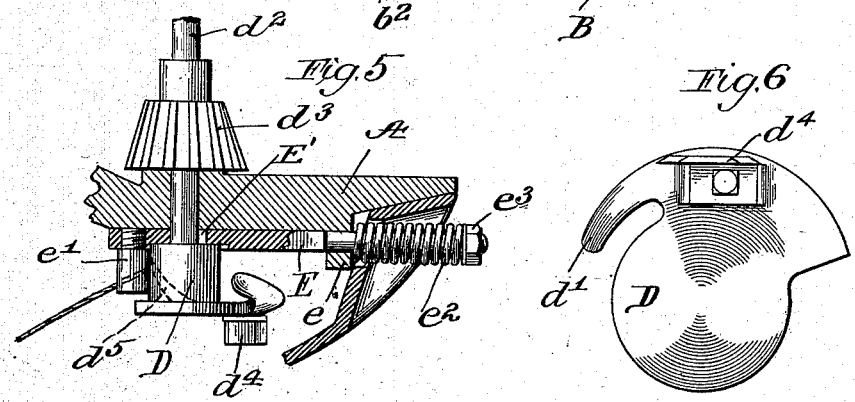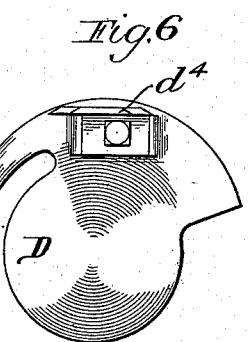

UNITED STATES PATENT OFFICE.

FRANK A. RYTHER, OF CHICAGO, ILLINOIS, ASSIGNOR TO DEERING HARVESTER COMPANY, OF CHICAGO, ILLINOIS.

KNOTTING DEVICE FOR AUTOMATIC BINDERS.

SPECIFICATION forming part of Letters Patent No. 714,242, dated November 25, 1902.

Application filed February 10, 1902. Serial No. 93,464. (No model.)

*To all whom it may concern:*

Be it known that I, FRANK A. RYTHER, of 16 Fullerton avenue, in the city of Chicago, county of Cook, and State of Illinois, have invented certain new and useful Improvements in Knotting Devices for Automatic Binders, of which the following is a full description, reference being had to the accompanying drawings.

The subject of my invention is an improvement on the knotting mechanism of automatic grain-binders; and it consists in novel means for preventing the cord from passing below the knotting-hook, which would thus result in the missing of the knot.

In connection with my improvement I have shown an improved cord-holding and cord-cutting device, which will form the subject-matter of another application.

Figure 1 is a perspective rear view of a knotter, showing my improvements. Fig. 2 is a front perspective view of the same. Fig. 3 is a sectional view showing the holder and latch for setting the twine free after the knot is tied. Fig. 4 is a sectional view of the same parts, showing the latch in place, having set the knot free. Fig. 5 is a sectional view of the holder. Fig. 6 is a bundle-side view of the disk which carries the knife. Fig. 7 is a perspective view showing a modified form of the holder in the position it is when taking the twine.

My invention is an improvement on the knotter and holder shown and described in the patent granted to Benjamin F. Stewart, numbered 512,762 and dated January 16, 1894.

A is the knotter-frame, and B the breast-plate, having the usual flanges $b$. The breast-plate is provided with the slot $b'$, having a curve $b^2$, down which the twine passes as drawn from the knotter.

C is a latch designed to maintain the twine in the position shown in Fig. 3 until the knot is completed. It is pivoted at $c$ and has the downwardly-extending arm $c'$.

D is the cylinder of the cord-holder, having the flange $d$ and also the horn $d'$. The cylinder rotates in the direction indicated by the arrow in Fig. 3. When the latch is in the position shown in Fig. 3, the slot in the breast-plate for the passage of the twine is closed; but when the holder has rotated to the position shown in Fig. 4 the latch is withdrawn, as shown in that figure, and the passage-way thus opened. The position of the flange $d$ is such as to permit the latch to remain in its closed position during the operation of tying the knot, as seen in Fig. 3. A spring $c^2$, secured to the breast-plate by a rivet, serves to hold the latch in its closed position.

The holder proper consists of the cylinder D, as stated, upon the shaft $d^2$, having thereon the mutilated pinion $d^3$. It is supported in the framework as shown by dotted lines in Fig. 2. Upon the bundle side of the flange $d$ is the knife $d^4$. Upon the portion of the knotter-frame A is fitted a plate E, adapted to slide in the bearings $e$ and provided with a slot E' at its upper end, the shaft $d^2$ passing therethrough and guided thereby. At its upper end is the cord-clamp, which may be a roller $e'$, as shown in Fig. 5, or a saddle $e^4$ as a modification of same. (Shown in Fig. 7.) In order to make the cord-clamp draw tightly down upon the cylinder D, upon the shank at its lower end is provided a spring $e^2$, as shown in Fig. 5. This spring may be tightened by the nut $e^3$. The cylinder D is provided with a low groove $d^5$.

F is the knotter, its shaft provided with the usual pinion. The pinion $d^3$ is provided with a delay-surface. Both pinions are operated by the cam-segment G, which is shown in Fig. 1. The knotter-jaw $f$ is pivoted in the usual manner and provided with a spring, (not marked in the drawings,) which closes it by acting upon an antifriction-roller, as usual.

The operation of my invention is as follows: When the twine is brought down by the needle, the twine being shown by dotted lines in Fig. 7, the holder moves and the twine brought down is engaged by the horn $d'$ and carried to the position shown in Fig. 7. Further rotation of the knotter leaves the twine in the position shown in Figs. 3 and 5. In this position the machine may be considered "threaded up." Upon another revolution of the binding devices the gear-teeth on cam-segment G first engage with the pinion on the knotter-shaft and rotate it half a revolution, at which time the leading-tooth on the said cam-segment G engages with the pinion on the holder-shaft $d^2$. The needle has already approached its forward limit and placed the twine across the knotter-hook before the hook turns, and making the first half-revolution the knotter-hook draws the held end of the twine from the holder in addition to drawing from the needle twine in the formation of the knot. On further movement of the cam-segment G the teeth on said segment, through the pinion $d^3$ and the shaft $d^2$, impart rotation to the holder D. When the knotter-hook will have completed its revolution, the holder will have made half a revolution, the knotter-jaw $f$ will have been just closed on the twine by its actuating-spring, the roller $e'$, Fig. 5, (or saddle $e^4$, Fig. 7,) coöperating with the cylinder D of the cord-holder, will have advanced to a point at which it can engage the needle-twine, and the knife $d^4$ of the cord-holder will be in position that further rotation will sever the twine. In Fig. 7 the cord-holder is shown advanced almost to the position above described. On further rotation there will occur in the next interval of time the practically simultaneous engaging of the twine, the cutting of the needle-twine between the knotter and holder, the release of the held end from the holder, and the withdrawal of the latch C from across the passage $b^2$ by the eccentric flange on the cord-holder engaging with the arm $c'$ of said latch. Immediately after and almost simultaneous also with the above operations the compressor-arm of the binder is released and the ordinary discharging mechanism pulls the twine from the knotter, and thus completes the knot in the usual way.

When using some kinds of twine, little or no movement of the clamp is required; but as wear takes place the parts should be drawn together, which is accomplished by the threaded lower end. Interposition of the spring renders the pressure elastic, and thus adapts the holder to all kinds of twine.

What I claim as my invention, and desire to secure by Letters Patent, is—

In a cord-knotting device, in combination a knotter-hook, a breast-plate having a passage-way for twine, a latch adapted to close said passage-way, a cord-holding cylinder adapted to make one complete revolution each time the binding mechanism is actuated, and provided with an eccentric flange, means for rotating the said cord-holding cylinder a complete revolution, a twine-engaging horn and a knife, mechanism extending from the latch to said cord-holder whereby the rotation of the latter operates to open the said passage-way, and a spring adapted to return the said latch to its usual position, substantially as described.

FRANK A. RYTHER.

In presence of—
C. W. SMITH,
EDW. BARRETT.